United States Patent
Savage et al.

(10) Patent No.: US 11,441,532 B2
(45) Date of Patent: Sep. 13, 2022

(54) SUBMERGED OSCILLATING WATER COLUMN ENERGY HARVESTER

(71) Applicant: IDAHO STATE UNIVERSITY, Pocatello, ID (US)

(72) Inventors: Bruce Savage, Pocatello, ID (US); Mohammadamin Torabi, Pocatello, ID (US)

(73) Assignee: Idaho State University, Pocatello, ID (US)

( * ) Notice: Subject to any disclaimer, the term of this patent is extended or adjusted under 35 U.S.C. 154(b) by 0 days.

(21) Appl. No.: 17/209,665

(22) Filed: Mar. 23, 2021

(65) Prior Publication Data

US 2021/0293218 A1 Sep. 23, 2021

Related U.S. Application Data

(60) Provisional application No. 62/993,312, filed on Mar. 23, 2020.

(51) Int. Cl.
*F03B 13/14* (2006.01)
*F03B 13/24* (2006.01)

(52) U.S. Cl.
CPC ............ *F03B 13/142* (2013.01); *F03B 13/24* (2013.01); *F05B 2210/404* (2013.01); *F05B 2240/40* (2013.01)

(58) Field of Classification Search
CPC .. F03B 13/142; F03B 13/24; F05B 2210/404; F05B 2240/40; Y02E 10/30
USPC ......................................... 290/42, 43, 53, 52
See application file for complete search history.

(56) References Cited

U.S. PATENT DOCUMENTS

| | | | | |
|---|---|---|---|---|
| 4,286,347 A | * | 9/1981 | Modisette | F03B 13/142 60/398 |
| 4,441,316 A | * | 4/1984 | Moody | F03B 13/142 417/100 |
| 6,930,406 B2 | * | 8/2005 | Montgomery | F03B 13/26 290/43 |
| 7,830,032 B1 | * | 11/2010 | Breen | F03B 13/142 290/55 |
| 8,105,052 B1 | * | 1/2012 | Hill, Jr. | F04B 47/06 60/497 |
| 8,628,303 B2 | * | 1/2014 | Smith | F03B 13/187 417/337 |
| 10,934,993 B2 | * | 3/2021 | Vazquez | F03B 13/1845 |

(Continued)

OTHER PUBLICATIONS

Alamian, et al. "Evaluation of technologies for harvesting wave energy in Caspian Sea" *Renew. Sust. Ener. Rev.* 32 (2014) pp. 468-476.

(Continued)

*Primary Examiner* — Charles Reid, Jr.
(74) *Attorney, Agent, or Firm* — Dority & Manning, P.A.

(57) ABSTRACT

Wave energy conversion (WEC) systems and methods for harvesting wave energy by use of the systems are described. WEC systems incorporate a plurality of submerged oscillating water columns (SOWC) that encourage oscillating water motion within each submerged column to mimic the motion of waves passing the SOWC system. A WEC system includes multiple SOWC connected to one another via air pockets within each submerged column. Each SOWC includes a float connected to a power take-off. The oscillations of the floats are converted to useful energy by the power take-off of the system.

17 Claims, 8 Drawing Sheets

(56) References Cited

U.S. PATENT DOCUMENTS

| | | | | |
|---|---|---|---|---|
| 2005/0099010 | A1* | 5/2005 | Hirsch | F03B 13/1845 290/42 |
| 2005/0207844 | A1* | 9/2005 | Boccotti | F03B 13/142 405/110 |
| 2007/0130929 | A1* | 6/2007 | Khan | F03B 13/185 60/398 |
| 2010/0117367 | A1* | 5/2010 | Muller | H02K 55/04 290/53 |

OTHER PUBLICATIONS

Awang, et al. "Potential Multi-Function Cylinder as Wave Attenuator" *J. Coast Zone Mgmt.* 21:2 (2018) pp. 1-8.
Babarit, et al. "Investigation on the energy absorption performance of a fixed-bottom pressure-differential wave energy converter" *Appl. Ocean Res.* 65 (2017) pp. 90-101.
Barbosa, et al. "Overtopping device numerical study: Openfoam solution verification and evaluation of curved ramps performances" *Int'U. Heat Mass Trans.* 131 (2019) pp. 411-423.
Beatty, et al. "Experimental and numerical comparisons of self-reacting point absorber wave energy converters in irregular waves" *Ocean Eng.* 173 (2019) pp. 716-731, (Abstract only).
Bevilacqua, et al. "Overtopping Wave Energy Converters: General Aspects and Stage of Development" *U. Bologna* (2011) pp. 1-21.
Brekken, T. "Fundamentals of ocean wave energy conversion, modeling, and control" *IEEE Int'l Symp. Indust. Electr.* (2010) pp. 3921-3966.
Callaway, E. "Energy: To catch a wave" *Nature* 450 (2007) pp. 156-159.
Cappietti, et al. "Laboratory tests on an original wave energy converter combining oscillating water column and overtopping devices" *Adv. Renew. Ener. Offshore.* (2019) pp. 791-796.
Cerveira, et al. "Mooring system influence on the efficiency of wave energy converters" *Int'l J. Marine Ener.* 3 (2013) pp. 65-81.
Chen, et al. "Study on force and wave energy conversion efficiency of buoys in low wave energy density seas" *Ener. Conv. Mgmt.* 182 (2019) pp. 191-200.
Clément, et al. "Wave energy in Europe: Current status and perspectives" *Renew. Sust. Ener. Rev.* 6 (2002) pp. 405-431.
Connell, et al. "Development of a free heaving OWC model with non-linear PTO interaction" *Renew. Ener.* 117 (2008) pp. 108-115.
Cordonnier, et al. "SEAREV: Case study of the development of a wave energy converter" *Renew. Ener.* 80 (2015) pp. 40-52.
Crowell, et al. "How Many People Live in Coastal Areas?" *J. Coastal Res.* 23 (2007) pp. iii-vi.
Cruz, J. "Ocean wave energy: Current status and future perspectives" *Springer* (2007) pp. 1-438.
Devolder, et al. "CFD simulations of floating point absorber wave energy converter arrays subjected to regular waves" *Energies* 11:641 (2018) pp. 1-23.
Doe. "Marine and Hydrokinetic Resource Assessment and Characterization" *Ofc. Ener. Efficiency Renew. Ener.* (2019) pp. 1-6.
Drew, et al. "A review of wave energy converter technology" *Proc. IMechE Pt A: J. Pow. Ener.* 223 (2009) pp. 887-902.
EMEC. "Wave devices" *Eur. Marine Energy Centre Ltd.* (2019) pp. 1-3.
Falcao, A.F.DO. "Wave energy utilization: A review of the technologies" *Renew. Sust. Ener. Rev.* 14 (2010) pp. 899-918.
Finavera. "Finavera Renewables Successfully Deploys and Commissions AquaBuOY 2.0 Wave Energy Converter" *Green Car Cong.* (2007) pp. 1-2.
Folley, et al. "The oscillating wave surge converter" *ISOPE 14th Int'l Offshore Polar Eng. Conf.* 2004-JSC-377 (2004) pp. 1-5.
Gilbert, et al. "Design curves for regular and random wave generators" *J. Hydraulic Res.* 9 (1971) pp. 163-196.
Gunawardane, et al. "Analysis of the hydrodynamics of four different oscillating wave surge converter concepts" *Renew. Ener.* 130 (2019) pp. 843-852.

Heath, T.V. "A review of oscillating water columns" *Phil. Trans. Roy. Soc. A* 370 (2012) pp. 235-245.
Henry, et al. "A conceptual model of the hydrodynamics of an oscillating wave surge converter" *Renew. Ener.* 118 (2018) pp. 965-972.
Holmberg, et al. "Wave power-Surveillance study of the development" *Elforsk Rapp* 11 (2011) 47.
Hübner, et al. "Numerical study comparing the incidence influence between realistic wave and regular wave over an overtopping device" *Thermal Eng.* 18 (2019) pp. 46-49.
Lehmann, et al. "The wave carpet: Development of a submerged pressure differential wave energy converter" *30th Symp. Naval Hydrodyn.* (2014) pp. 1-9.
Loh, et al. "Assessments of Wave-Structure Interactions for an Oscillating Wave Surge Converter using CFD" *U. Plymouth* (2018) pp. 1-254.
Lomonaco, et al. "Physical model testing of the scour induced by apex, a submerged pressure differential wave energy converter" *Proc. 7th Int'l Conf. Appl. Phys. Model. Coast. Port Eng. Sci. Coastlab* 18 (2018) pp. 1-9.
López, et al. "Efficiency of OWC wave energy converters: A virtual laboratory" *Appl. Ocean Res.* 44 (2014) pp. 63-70, (Abstract only).
Maloney, P. "Performance assessment of a 3-body self-reacting point absorber type wave energy converter" *U. Victoria* (2019) pp. 1-149.
Mekhiche, M. "PB500, 500 KW Utility-Scale PowerBuoy Project—Rev. B" *Ocean Pow. Tech. Inc.* DOE-OPT-EE0003645 (2016) pp. 1-21.
Moreno, et al. "Experimental assessment of a 6-float M4 wave energy converter" *Adv. Renew. Ener. Offshore* CRC Press (2019) pp. 401-407.
Ning, et al. "Experimental and numerical investigations on wave dynamics of a dual-chamber OWC wave energy device" *ASME 38th Int'l Conf. Ocean Offshore Arctic Eng.* OMAE2019-95165 (2019) pp. 1-6.
Orer, et al. "An experimental study on the efficiency of the submerged plate wave energy converter" *Renew. Ener.* 32 (2007) pp. 1317-1327.
Rhinefrank, et al. "Numerical and experimental analysis of a novel wave energy converter" *ASME 29th Int'l Conf. Ocean Offshore Arctic Eng.* OMAE2010-20901 (2010) pp. 559-567.
Ruellan, et al. "Design methodology for a SEAREV wave energy converter" *IEEE Trans. Ener. Conver.* 25 (2010) pp. 760-767.
Rusu, et al. "A review of the technologies for wave energy extraction" *Clean Ener.* 2 (2018) pp. 10-19.
Rusu, E. "Evaluation of the wave energy conversion efficiency in various coastal environments" *Energies* 7 (2014) pp. 4002-4018.
Savage, et al. "Flow over ogee spillway: Physical and numerical model case study" *J. Hydraulic Eng.* 127 (2001) pp. 640-649.
Shadman, et al. "A geometrical optimization method applied to a heaving point absorber wave energy converter" *Renew. Ener.* 115 (2018) pp. 533-546.
So, et al. "Modeling of a Wave Energy Oscillating Water Column as a Point Absorber Using WEC-Sim" *IEEE Trans. Sustain. Ener.* (2019) pp. 851-858, (Abstract only).
Sorensen, R.M. "Basic coastal engineering" *Springer* (2005) pp. 1-329.
Taniguchi, et al. "Motions and Load Characteristics of an Attenuator Type Wave Energy Converter in Longitudinal Waves" *J. Jap. Soc. Nov. Archit. Ocean Eng.* 27 (2018) pp. 89-98, (Engl. Abstract Only).
Tethys. "Wave: Capturing energy from waves" *Tethys Engineering* (2019) pp. 1-3.
Têtu, A. "Power take-off systems for WECs" *Handbook of Ocean Wave Energy Springer* (2017) pp. 203-220.
Titah-Benbouzid, et al. "Ocean wave energy extraction: Up-to-date technologies review and evaluation" *IEEE Power Elect. Appl. Conf. Expo. (PEAC)* (2014) pp. 1-5.
Torabi, et al. "Modeling of a Novel Submerged Oscillating Water Column (SOWC) Energy Harvester" *7th Int'l Jr. Res. Eng. Workshop Hydraulic Struct.* (2019) pp. 1-11.
Valério, et al. "Optimization of wave energy extraction with the Archimedes Wave Swing" *Ocean Eng.* 34 (2007) pp. 2330-2344.

(56) References Cited

OTHER PUBLICATIONS

Vertechy, et al. "Oscillating-water-column wave-energy-converter based on dielectric elastomer geaerator" *ISOP Electroactive Polym. Actuat. Dev. (EAPAD)* 8687 (2013) pp. 1-13.
Washington, F. "Wave Energy Conversion" *The Military Engineer* (2019).
Weber, et al. "Wavebob—Research & development network and tools in the context of systems engineering" *Proc. 8th Eur. Wave Tidal Ener. Conf.* (2009) pp. 416-420.
Wei, et al. "Wave interaction with an oscillating wave surge converter, Part I: Viscous effects" *Ocean Eng.* 104 (2015) pp. 185-203.
Whittaker, et al. "Nearshore oscillating wave surge converters and the development of Oyster" *Philos. Trans. Roy. Soc. A* 370 (2012) pp. 345-364.
Wikipedia. "Salter's duck" Wikipedia.org (2020) pp. 1-3.
Yang, et al. "Numerical Simulation of Attenuator Wave Energy Converter Using One-Fluid Formulation" *ISOPE 28$^{th}$ Int'l Ocean Polar Eng. Conf.* (2018) pp. 602-607.
Zhang, et al. "SPH method with applications of oscillating wave surge converter" *Ocean Eng.* 152 (2018) pp. 273-285.

\* cited by examiner

SUBMERGED OSCILLATING WATER COLUMN ENERGY HARVESTER

CROSS REFERENCE TO RELATED APPLICATION

This application claims filing benefit of U.S. Provisional Patent Application Ser. No. 62/993,312, entitled "Submerged Oscillating Water Column (SOWC) Energy Harvester," having a filing date Mar. 23, 2020, which is incorporated herein by reference in its entirety.

BACKGROUND

More than 50% of the U.S. population lives within 50 miles of an ocean coastline. Ocean waves contain a significant amount of energy that can be extracted from the surface motion of the water or pressure fluctuations caused by the motion of the water. By efficient use of marine and hydrokinetic technologies, the natural resource potential of ocean waves could be utilized to provide energy for much of the U.S. population. For instance, according to the U.S. Department of Energy, ocean waves have the theoretical potential of 1594-2640 TWh/year and a technical energy (i.e., a portion of a theoretical resource that can be captured) of 898-1229 TWh/year. For comparison, roughly 90,000 homes can be powered by about 1 TWh/year.

Multiple designs for wave energy converters (WEC) have been developed in an attempt to capture energy from ocean waves. WEC are traditionally categorized by installation location (shoreline, nearshore or offshore) or by their Power Take-Off (PTO) system (hydraulic, air turbine, hydro turbine, direct mechanical drive system or direct electrical drive system). Another type of categorization is their functionality, which classifies WEC in six groups including: Point Absorber, Attenuator, Oscillating Wave Surge Converter (OWSC), Oscillating Water Column (OWC), Overtopping, and Submerged Pressure Differential. Point Absorbers are single floating structures on the water surface that absorb energy from waves in all directions and generally generate between 250 kW to 1 MW of power. Attenuators are typically floated parallel to the wave front direction. They are relatively lengthy (up to 150 m) and consist of buoyant segments hinged together and articulated by crossing the waves. OWSCs are bottom-hinged structures that have been considered to be more efficient than other systems because they match the motion of the water particles better than other system types. OWCs are partially submerged hollow structure devices that are open at the bottom to the sea and include a column of air at the top and above the water surface that increases and decreases in height with the waves to turn a turbine. Submerged pressure differential devices are located near shore and sit on the ocean floor. As the waves cross over, the sea level above the device increases and decreases which leads to a cycling pressure differential that is used to capture the energy of the passing wave.

Figure 1:
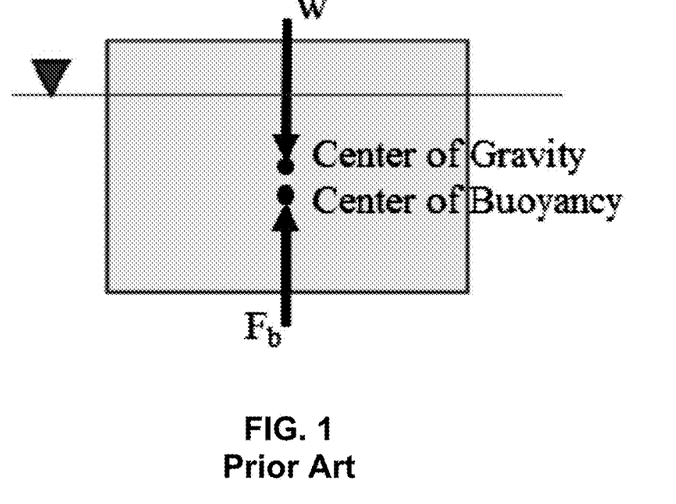
FIG. 1 illustrates a partially submerged body and the opposing weight force and buoyancy force acting on the body as known in the art.

All of these WEC systems have been used with varying success. Most operate on the concept of a changing water surface height due to the passing waves or a changing hydrostatic pressure in a column of water and using Archimedes' principle of the buoyant force. Archimedes' principle states that a body submerged in a fluid has a buoyancy force ($F_b$) acting on the body equal to the specific weight ($\gamma$) of the displaced fluid times the displaced volume ($V$), $F_b = \gamma V$. FIG. 1 shows a square body partially submerged with the weight force acting down through the center of gravity and the buoyancy force acting upward through the center of the submerged volume, or the center of buoyancy. WEC that utilize Archimedes' principle in energy capture generally connect a buoyant object to an energy transfer device, e.g., a shaft, hinge, or the like. The oscillating motion of the waves is transferred to the buoyant object so as to convert that wave motion to a mechanical motion of the transfer device, the energy of which can be captured for other uses by a PTO system.

While the above describes improvement in the art, room for further improvement exists. What is needed in the art are WEC systems that can efficiently convert wave energy to useful energy, and ideally can do so without interfering with the aesthetics and ecology of the local environment, while also surviving the harsh conditions of an ocean environment.

SUMMARY

According to one embodiment, disclosed is a wave energy converter (WEC) system that includes multiple submerged oscillating water column (SOWC) connected to one another. A system can include a first SOWC that has a first end attached to (e.g., embedded in) a sea floor and a second end at a distance above the sea floor. The first SOWC also has a wall that extends from the first end to the second end, with at least one opening defined in the SOWC. This opening (or more than one opening) allows for water flow between the exterior of the first SOWC and the interior of the first SOWC. The first SOWC also has an air pocket at the second end and internal to the first SOWC. In addition, there is a float retained within the first SOWC that is in mechanical communication with a power take-off (PTO).

A system can also include a second SOWC that has a first end attached to the sea floor and a second end above the sea floor. The second SOWC also has a wall that extends from the first end to the second end, with at least one opening defined in the SOWC. This opening (or more than one opening) allows for water flow between the exterior of the second SOWC and the interior of the second SOWC. The second SOWC also has an air pocket at the second end and internal to the SOWC. In addition, there is a float retained within the second SOWC that is in communication with the PTO.

The system also includes an air line that connects the first air pocket to the second air pocket. The first and second SOWC are submerged and as such, the water levels within the first and second SOWC are below the surface water level of the water surrounding/covering each respective SOWC.

In embodiments, a system can include additional SOWC, each of which includes an air pocket that is connected to at least one other SOWC air pocket of the system via an air line and each of which includes a float in communication with the PTO.

Also disclosed is a method for harvesting wave energy. For instance, a method can include forming a first air pocket in a first SOWC, forming a second air pocket in a second SOWC, and connecting the two air pockets to one another via an air line. The first and second SOWC can be attached to the sea floor at their lower ends. As a wave passes the first and second SOWC, the water level within each SOWC will mimic the vertical motion of the external water, causing air to move out of one air pocket and into the other and causing the float within one SOWC to rise and the float in the adjacent SOWC to drop. The motion of the floats can be translated to a PTO, which can harvest energy of the wave passing the SOWC.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed herein are wave energy conversion systems and methods for harvesting wave energy by use of the systems. Disclosed systems incorporate a plurality of submerged oscillating water columns (SOWC) that encourage oscillating water motion within each column, thereby efficiently mimicking the motion of waves passing the SOWC system. To improve efficiency and energy conversion of the systems, multiple SOWC of a system are connected to one another via air pockets within each submerged column. As such, the multiple SOWC of a system are in fluid communication with one another and a pressure differential can be developed across the system as waves pass this system. The pressure differential and related air flow through the system can provide for a submerged system that is highly efficient with excellent energy conversion.

Disclosed systems can be submerged, and as such, can be located near populated areas without raising aesthetic issues that are common with other natural energy capture devices that extend above the ocean surface. Beneficially, the systems also can have a relatively small impact on the ocean floor, and as such, can cause little or no interference with the underwater ecology of an area.

Disclosed systems need not be located far off-shore in deep water, and actually, can be more effective when located at a transitional or shallow water depth. As such, the systems are more easily accessible for repair and maintenance as compared to many previously known systems. In addition, as disclosed, systems are submerged and capable of quick and straightforward shut-down and start-up, the systems can withstand oceanic weather events better than many previously known WEC systems.

Disclosed systems can be highly efficient. For instance, disclosed systems can model about 70% or more of the surface water wave movement in an area and the efficiency of a single SOWC of a system can be about 70% or greater; for instance, about 80% or even higher in some embodiments. As utilized herein, the term "SOWC efficiency" generally refers to the change in water depth within a SOWC relative to the change in water depth external to the SOWC as a wave passes the SOWC (i.e., the height of the wave).

Figure 2:
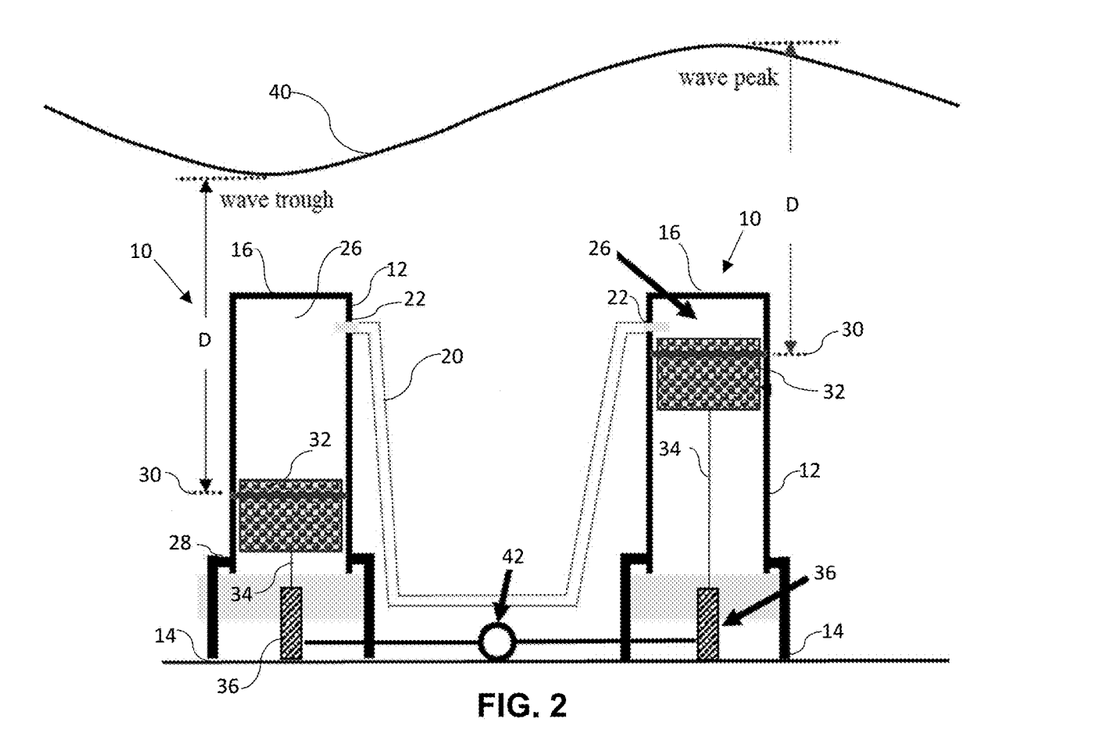
FIG. 2 illustrates one embodiment of a two column WEC system as disclosed herein.

FIG. 2 provides a schematic illustration of one embodiment of a WEC system as disclosed herein. In this embodiment, the system includes two SOWC 10. Each SOWC 10 includes a surrounding wall 12 that surround a hollow interior of the SOWC 10. The surrounding wall 12 can generally be circular, giving the SOWC 10 an overall cylindrical shape, but this is not a requirement of a system, and other cross-sectional shapes for an individual SOWC 10 are encompassed herein.

Each SOWC 10 is attached to the seabed at the lower end 14 and capped at the upper end 16 so as to be water- and air-tight at the upper end 16. The overall size of each SOWC can vary. In one embodiment, dimensions of each SOWC can be selected based upon the wave characteristics of an area in which a system is to be located. For instance, in one embodiment, each SOWC of a system can have a largest cross-sectional size (e.g., diameter) that is about the same as or less than a typical (e.g., average) half-wavelength for the ocean waves in the area of use. For instance, each SOWC of a system can have a largest cross-sectional size of about 10 feet or less, depending on the local wave characteristics; for instance, from about 1 foot to about 10 feet, from about 2 feet to about 9 feet, or from about 3 feet to about 8 feet, in some embodiments. Each SOWC of a system can have a height that is larger than a typical wave height H (i.e., the vertical distance between the peak and the trough of a wave) for the ocean waves in the area of use. For instance, each SOWC of a system can have a height as measured from the sea floor to the cap of the SOWC above the sea floor that is about 1.5 times the typical wave height of the area or greater, with a maximum height depending upon the depth of the water in which the system is to be located. For instance, each SOWC can have a height that is from about 4 feet to about 15 feet.

Each SOWC 10 is submerged. As such, the lower end 14 of each SOWC will be retained at the sea floor and beneath the surface water level during normal operation. As utilized herein, the term "surface water level" generally refers to the average water surface location between wave peaks and troughs. While the cap at the upper end 16 of each SOWC 10 can also be submerged during normal operations, this is not a requirement of a system. For instance, the top surface of a SOWC at the upper end 16 may be at or even above the surface water 40 level during all or part of operations (e.g., during low tide). However, during operation, a water column within a SOWC will have a water surface 30 that is lower than that of the water surface 40 of the external water. For instance, as illustrated in FIG. 2, at both a wave trough (left) and a wave peak (right) there will be a driving depth D as measured between the external water surface 40 at an individual SOWC 10 and the water surface 30 within that SOWC 10 that is non-zero, with the external water surface 40 vertically higher than the water surface 30 within that SOWC.

An individual SOWC 10 need not exhibit a constant cross-sectional size or shape over the entire height of the SOWC. For instance, in the illustrated embodiment of FIG. 2, each SOWC 10 have a somewhat larger cross-sectional size at the lower end 14 as compared to the upper end 16. A size transition can be abrupt or gradual, as desired.

In one embodiment, a surrounding wall 12 can include connectors for construction, modification, repair, maintenance, etc. For instance, in one embodiment, a SOWC 10 can include a connection 28, e.g., a hinged connection or the like, that can allow for the SOWC 10 to be temporarily disconnected and/or rotated so as to be laid along the sea floor for a period of time, for instance, during a storm. At a later time, for instance, following passage of a storm, repair of a system component, etc., the SOWC 10 can be re-assembled in the working vertical arrangement by realignment/reassembly at the connection 28.

Figure 3:
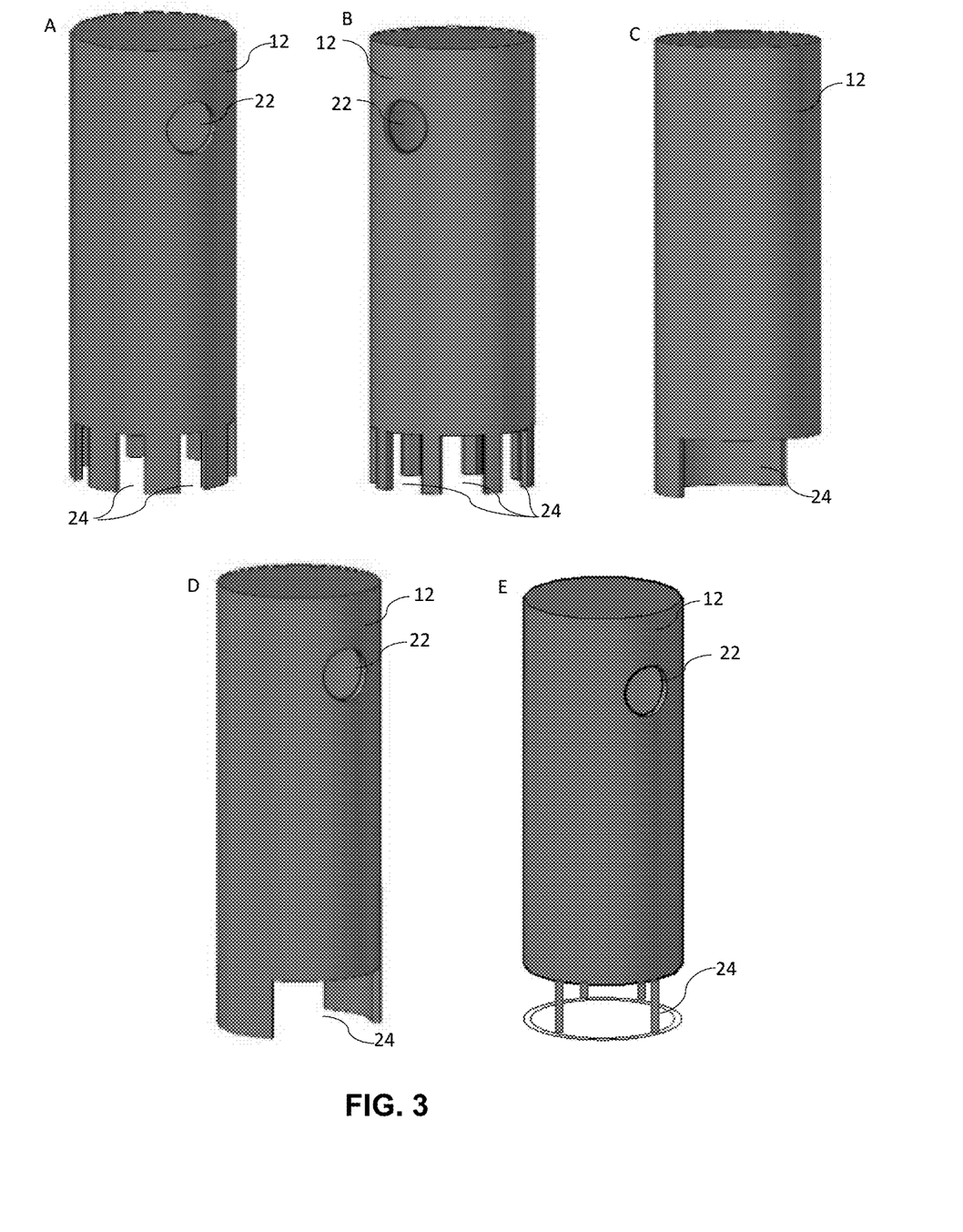
FIG. 3 illustrates several examples of SOWC body configurations encompassed herein.

Each SOWC 10 include one or more openings 24 (FIG. 3) that allow for water flow in and out of the interior of the SOWC during operation. The location, number, arrangement, shape, etc. of the openings is not particularly limited, provided that the opening(s) 24 allow for the surrounding sea water to flow in/out of the SOWC 10 in conjunction with the wave motions of the surrounding water. By way of example and without limitation, FIG. 3 illustrates several different SOWC configurations, including different sizes/arrangements of openings 24 at the lower ends. As illustrated, a SOWC can include a single opening 24, two, three, or more openings 24 to allow water flow therethrough.

Openings 24 in the SOWC that provide water communication between the interior of each SOWC and the surrounding ocean water need not be only at the bottom of the column, as in FIG. 3, but may alternatively or additionally be connected to a conduit through the side or top with an opening located external to the main body of the SOWC.

Figure 4:
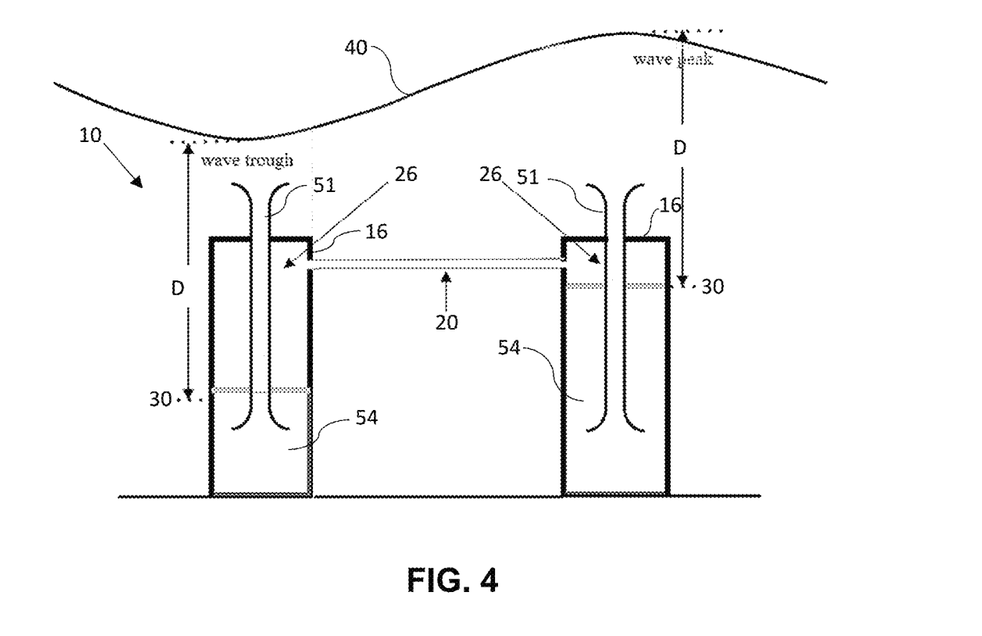
FIG. 4 illustrates another embodiment of a two column WEC system as disclosed herein.
Figure 5:
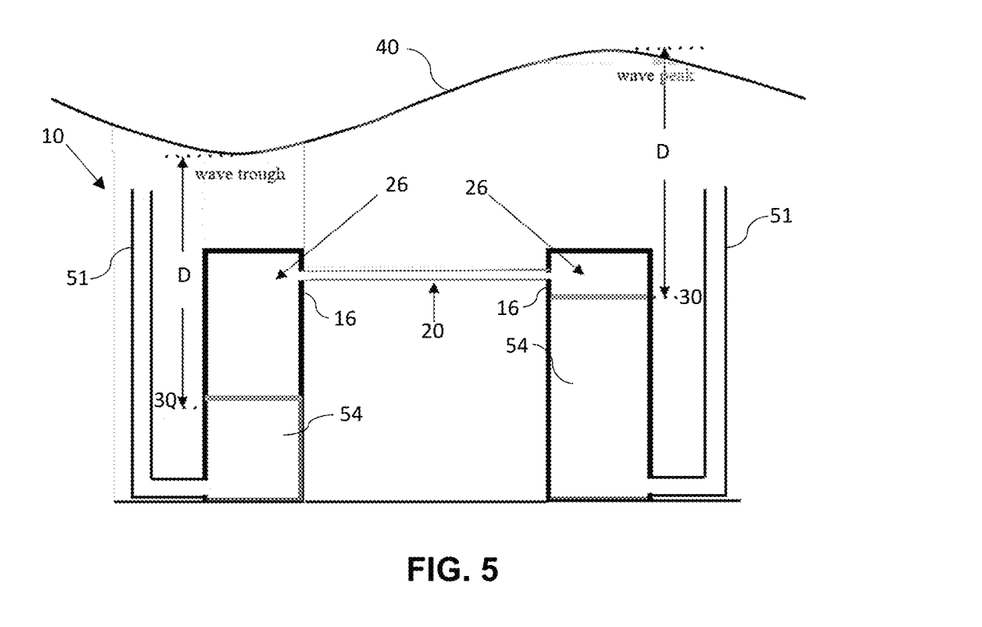
FIG. 5 illustrates another embodiment of a two column WEC system as disclosed herein.

For example, FIG. 4 and FIG. 5 illustrate the main body portions of two exemplary embodiments of other WEC systems as disclosed herein. In this embodiment, the systems also include two SOWC 10. In these systems, each SOWC includes an inlet 51 that provides a submerged opening allowing for water flow into and out of the interior of the SOWC. As shown, the inlet 51 can communicate water through the air pocket 26 of the SOWC 10 or into the oscillating column of water 54 beneath the air pockets 26.

In addition to one or more openings 24 for water communication with the surrounding ocean, each SOWC 10 is connected to at least one other SOWC 10 via an airline 20 (FIG. 2, FIG. 4, FIG. 5). A connection port 22 can be located in a surrounding wall 12 or top surface of each SOWC 10 for connection to an airline 20. In the embodiment illustrated in FIG. 2, the connection port 22 can be located higher in the SOWC 10 (closer to the upper end 16) than any openings 24 to the surrounding water, so as to prevent flooding of the air line(s) 20 during use. However, in other embodiments, such as that of FIG. 4, the inlet 51 can pass through the air pocket 26, so as to allow water flow into the column of water 54 without flooding of the air pocket 26.

Materials of formation for the SOWC 10, air lines 20, connections 28, connection ports 22, and other components of a system can include any suitable material for use in a submerged state. By way of example and without limitation, surrounding walls 12, air lines 20, connectors, and other submerged components of a system can be formed of metals, polymers, multilayer composites, coated materials, etc. as are generally known in the art that can withstand a saltwater environment and provide a suitable working lifetime.

During use, an air pocket 26 is formed in the upper end 16 of each SOWC 10. A connection port 22 will be located on a surrounding wall 12 such that the air line 20 communicates with the air pocket 26 allowing for air to freely move in and out of the air pocket 26 via the air line 20.

As shown in the illustrated embodiments, as a wave passes each SOWC 10, the water level 30 within the SOWC 10 will rise and fall as well, mimicking the level of the water surface 40 at the SOWC, but at a driving depth D beneath the water surface level 40. At the wave trough (left SOWC 10 in FIG. 2, FIG. 4, FIG. 5), the water level surface 30 within the SOWC 10 will be at a low level and at the wave peak (right), the water level surface 30 within the SOWC 10 will be at a high level, as shown. As the water level within each SOWC oscillates between peaks and troughs, the fluctuating water level will create an oscillating hydrostatic pressure differential in the connected air pockets 26. The air in the system will respond to the pressure differential and exit/enter the air line 20. As the air pockets 26 of the SOWCs 10 are in fluid communication with one another via the air line 20, the pressure within the system as a whole can remain relatively constant, similar to the pressure of the air at the external water level surface 40. Without wishing to be bound to any particular theory, it is believed that the air flow communication between the SOWC 10 of a system allows for improved mimicking of the vertical motion of the water surface 40 external to the SOWC and provides for increased efficiency and energy capture by the WEC systems.

To harvest energy of a passing ocean wave, each SOWC 10 of a system can retain a float 32 (FIG. 2) at the air pocket/water surface 30 within the surrounding wall 12. Each float 32 can be formed of a suitably buoyant material that can maintain buoyancy over a working lifetime with little or no degradation due to contact with the seawater of the local environment. For instance, a float can be formed of a polymeric foam, e.g., a polyurethane or polystyrene foam, wood, molded plastics, or any other suitable material or combination thereof.

Each float 32 can be connected to a PTO via an energy transfer device 34. Though illustrated as a shaft in FIG. 2, it will be understood that an energy transfer device 34 can be in any form, e.g., a hinge, a shaft, a rotational device, etc. The energy transfer device 34 can be of any form that can transfer the vertical motion of the float 32 caused by the oscillating water within the surrounding wall 12 of the SOWC 10 to a component of a PTO.

The PTO can utilize any energy conversion/output mechanism(s) or combination thereof as are known in the art including, without limitation, hydraulic actuators, electrical linear generators, fluid pumps, etc.

In one embodiment, the power take-off system can employ a pump 36 associated with each SOWC 10. Each pump 36 can be in mechanical communication with a float 32 via an energy transfer device 34. In addition, each pump 36 can be in communication with other components of a PTO. For instance, each pump 36 can be in communication with a common high pressure transmission line 42 and can be configured to deliver a pump fluid, e.g., water, carried in the transmission line through increased pressure of the pump fluid developed at the pump 36. Briefly, the oscillating motion of the float 32 within each SOWC 10 can convert wave energy into mechanical energy that can then be used to pressurize the pump fluid in the transmission line 42.

Figure 6:
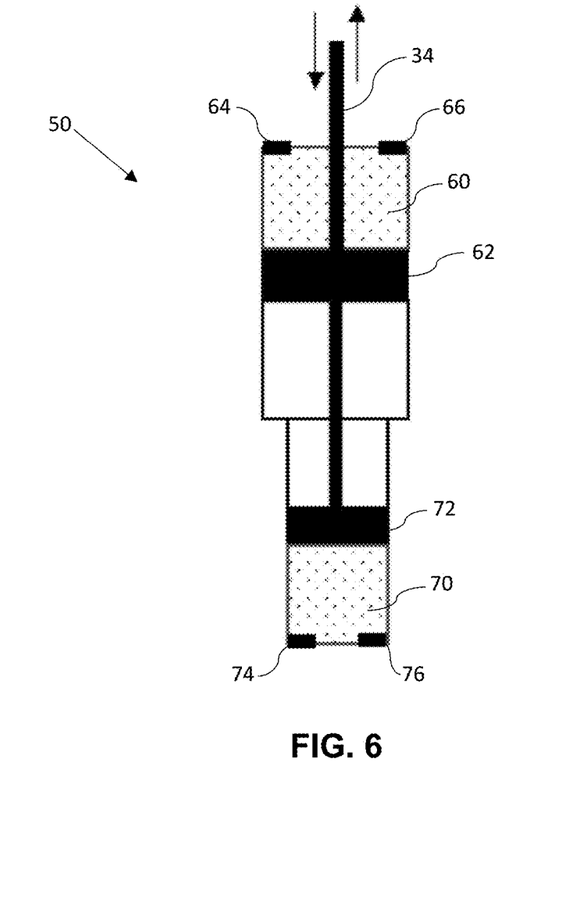
FIG. 6 illustrates a dual action pump as may be incorporated in a power take-off (PTO) in a WEC system as described herein.

In one embodiment, a PTO can incorporate a hydraulic system that employs a dual action pump in each SOWC 10. One embodiment of a dual action pump 50 as may be incorporated in disclosed devices is illustrated in FIG. 6. As shown, a dual action pump 50 can include an upper chamber 60 and a lower chamber 70, each containing a pump fluid and sealed by use of upper chamber piston 62 and lower chamber piston 72, which are both connected to an energy transfer device 34. During use, as the energy transfer device 34 rises in conjunction with the motion of a float 32 due to the buoyancy force as indicated by the directional arrow in FIG. 4, it causes the pistons 62 and 72 to rise, forcing pump fluid out of upper chamber 60 via upper chamber pump outlet 66 and pulling pump fluid into lower chamber 70 via lower chamber pump inlet 74. Following, as the float 32 drops with the water surface 30 inside the SOWC 10 under the weight force of the float 32, the energy transfer device 34 drops and pushes the pistons 62, 72 down. As it drops, piston 72 forces pump fluid out of the lower chamber 70 via the lower chamber pump outlet 76 and pulls pump fluid into the upper chamber 60 via upper chamber pump inlet 64. Using the principle of force=pressure×area, the oscillating motion of the pump pistons 62, 72 can add energy to the pump fluid by in an amount that is proportional to the area of contact between the pump surfaces (i.e., the contact area of the chambers and the contact surface areas of the pistons) and the pump fluid.

In one embodiment, a system can be designed to transfer a similar amount of energy to the pump fluid on both the downstroke of the pistons 62, 72 and the upstroke of the pistons 62, 72. As the weight force of the float 32 is necessarily less than the buoyant force of the float 32, this can be accomplished by using a dual action pump having a smaller lower chamber 70 and piston 72 as compared to the upper chamber 60 and piston 62.

In one embodiment, the outlets of a dual action pump 66, 76 can be in fluid communication with a single transmission line 42 so as to deliver a single unidirectional fluid output from a SOWC 10 to a transmission line 42. Such an embodiment can maximize the energy conversion of the PTO while delivering a unidirectional flow of pressurized pump fluid from the WEC system. A dual action pump 50, as well as other components of a PTO, can optionally include other components as are generally known in the art such as, and without limitation to, check valves, vacuum chambers, accumulator chambers, low friction materials, corrosion resistant materials, etc.

The energy of the pressurized flow in a transmission line 42 can be used or stored as desired. For instance, the energy of the pressurized flow can be used to move the pump fluid to a higher elevation reservoir for storage and later use; for instance, in hydroelectric power generation. In one embodiment, the pressurized flow in the transmission line 42 can be in direct communication with a turbine (e.g., a Pelton wheel turbine) for direct generation of electricity. Any other energy storage/conversion systems as are known in the art can be utilized.

A SOWC system includes multiple SOWCs spaced apart from one another and in communication with one another via the air lines. Ideally, and as illustrated in FIG. 2, FIG. 4, and FIG. 5, two SOWC of a system will be located such that the center of each SOWC is one-half wavelength apart from one another, e.g. from about 2 feet apart to about 20 feet apart; for instance, from about 4 feet apart to about 10 feet apart in some embodiments, depending upon the typical ocean wavelength of the area in which the system is to be located. By locating SOWCs one-half wavelength apart from one another, adjacent SOWC in the direction of travel of the wave front (perpendicular to the wave front) can be at a maximum phase difference from one another. Consequently, while a first SOWC experiences an increase in pressure, a paired SOWC one-half wavelength away in the direction of travel of the wave front sees a decrease in pressure. The increased pressure raises the water surface level 30 and the float 32 inside one SOWC 10 and moves the air out of the air pocket 26 through the air line 20 and into the air pocket 26 of a paired SOWC 10 which is experiencing a decreased pressure due to the passage of the wave trough. The two paired columns thus operate in tandem, with the water surfaces 30 and the associated floats 32 oscillating together in opposite directions.

A system is not limited to only a single pair of SOWC 10, however, and in embodiments can include a large number of SOWC 10. The SOWC 10 of a system can be located relative to one another and spaced apart from one another so as to maximize the probability of matching SOWC locations with wavelengths and wave directions of the ocean waves in the local area. For instance, in one embodiment, a system can include multiple SOWCs together in an organized pattern that can include multiple different spacings between SOWCs and relative locations of SOWCs, so as to match in sub-increments the most common wavelengths and/or wave directions for a location-specific wave spectrum. As such, a system can be tuned to maintain efficiency.

As more SOWCs are added to a system, the air pocket in each SOWC 10 becomes a smaller portion of the overall air reservoir of the entire connected system. Even if one column is out of sync, the effect of that on the overall efficiency of the system will decrease with an increasing number of SOWCs. In theory, the water surface motion inside the columns will approach the wave surface motion minus energy losses (due the seawater flowing in and out of each column, air flow head loss, etc.). Hydraulic principles as are known in the art can minimize losses through smooth transitions and sufficiently sized air lines.

Figure 7:
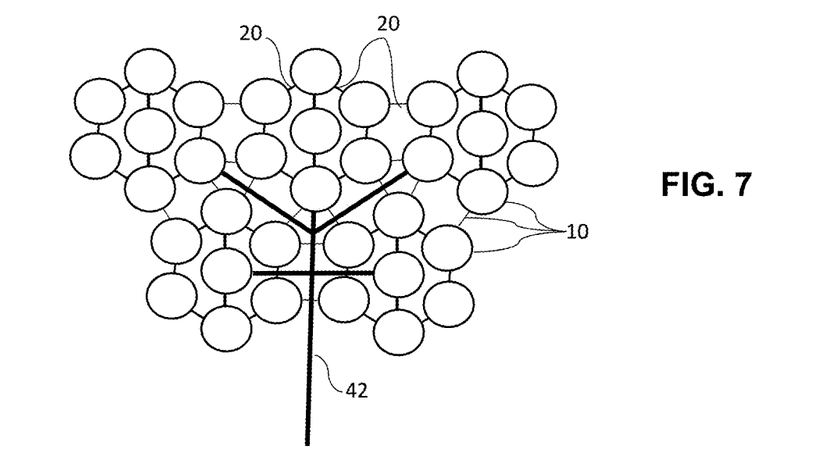
FIG. 7 presents a top view of one embodiment of a multi-unit SOWC system as described herein.

FIG. 7 schematically illustrates a top view of one embodiment of a multi-SOWC 10 system that includes a large number of individual SOWCs 10 each defining an air pocket therein that is in fluid communication with an air pocket of one or more other SOWCs 10 of the system via air lines 20. In addition, each of the SOWC 10 contains a float that is in communication with the PTO of the system, e.g., a hydraulic system as described above, such that the pressurized fluid flow from all of the individual SOWC 10 of a system feeds to one or more high pressure transmission line(s) 42. The spacings between individual SOWCs of the systems can be the same or varied, to improve matching of the system to the wavelengths of the passing waves of an area as well as to allow for variation in wave direction of the local area.

While disclosed systems can be located in any depth of water, in one embodiment, improved efficiency can be obtained by locating a system in shallow or transitional depth water. Without wishing to be bound to any particular theory, and as discussed further in the Examples section, below, upon increase of the relative depth of a system, the efficiency of the overall system can decrease. As utilized herein, the term "relative depth" refers to a dimensionless parameter that is the ratio of the water depth at the system location d (e.g., the average water depth over the complete area covered by a multi-SOWC system) to the average wavelength passing the system L.

In one embodiment, a highly efficient system can be provided by locating the system such that the relative depth of the system d/L is low and average height of the passing waves H is large. Such a system will be located at a depth prior to waves breaking. In one embodiment, a system can be located in an ocean area at which the ratio of a typical wave height to a typical depth is about 0.78 or less.

In one embodiment, a system can be located in shallow water or transitional depth water. Water depth classification can generally refer to deep water as those ocean areas in which the typical wavelength is greater than 0 and less than about twice the water depth, i.e., 0<L<about 2d, i.e., d/L is greater than about 0.5. Transitional depth encompasses those areas where the relative depth d/L is from about 0.5 to about 0.05, i.e., approximately 2d<L<20d, and shallow water is classified as those areas in which d/L is less than about 0.05, i.e., approximately 20d<L.

Disclosed WEC can provide highly efficient energy conversion in convenient locations without destruction of local ecology or aesthetic issues common to other natural resource energy capture systems.

The present disclosure may be better understood with reference to the Examples set forth below.

EXAMPLES

| | Notation |
|---|---|
| $A_x$ | fraction of open level in x directions |
| $A_y$ | fraction of open level in y directions |
| $A_z$ | fraction of open level in z directions |
| $a_c$ | amplitude of water surface inside the cylinders |
| $a_i$ | amplitude of incident waves |
| d | Water depth |
| $f_i$ | Reynolds stresses |
| g | gravity |
| h | Height of the cylinder |
| L | Wave length |
| P' | pressure |
| T | Wave period |
| $V_F$ | fluid volume fraction |
| u | velocities in x direction |
| v | velocities in y direction |
| w | velocities in Z direction |
| ρ | density |

Methods and Material

Computational Fluid Dynamic (CFD) based numerical methods were used based on solving the Reynolds-averaged Navier-Stokes (RANS) equations with a finite-volume method. Equations (1) and (2), the continuity and momentum equation respectively, governed the motion of the fluid.

$$\frac{\partial}{\partial x}(uA_x) + \frac{\partial}{\partial y}(vA_y) + \frac{\partial}{\partial z}(wA_z) = 0 \quad (1)$$

$$\frac{\partial U_i}{\partial t} + \frac{1}{V_F}\left(U_j A_j \frac{\partial U_i}{\partial x_j}\right) = -\frac{1}{\rho}\frac{\partial P'}{\partial x_i} + g_i + f_i \quad (2)$$

In the Equations, $V_F$ is the fluid volume fraction in each SOWC and can be zero, one, or between zero to one depending on if the SOWC is empty (0), full (1), or partially filled with fluid; the variables u, v and w are velocities in the x, y, and z directions. $A_x$, $A_y$, and $A_z$ are the fraction of open areas in x, y, and z directions on the cell faces; p is the density; P' is the pressure, and gi is the gravitational force. The variable $f_i$ indicates the Reynolds stresses (Savage and Johnson, 2001). Turbulence was modeled by using the Renormalized Group (RNG) Theory. Since the volume of air is contained in the top region of the SOWCs, the air was modeled as a void region using an adiabatic bubble to represent the void pressure. This allowed the system to be modeled as a single fluid (water) rather than model the system as two fluids (air and water). Flow-3D® treats the airflow as a confined adiabatic bubble. The bubble model evaluates the void region pressure based on the volume by using the isentropic model of expansion/compression in which $PV^\gamma$ is constant.

The Flow-3D® software package was used for the numerical modeling. With a dual 3.4 GHz quad-core computer and 64 GB RAM each simulation took 6 to 12 hours to complete 50 seconds of simulated flow time. Floating buoys were placed inside and above each SOWC to track the water surface movement. All the rotations and movements except z direction were constrained. After reaching quasi-steady state, the buoys' motion over time was exported and the wave height and the efficiency was extracted and analyzed using a MATLAB® signal processing algorithm. The difference between adjacent peaks and troughs was calculated and averaged and the conversion efficiency measured by dividing the relative movement of the SOWC buoys to surface buoys and defined as:

$$\varepsilon = \frac{a_c}{a_i}$$

in which $a_c$ is the amplitude of water surface inside the cylinders and $a_i$ is the amplitude of incident waves. The dimensionless relative depth parameter $$\frac{d}{gT^2}$$

was calculated to find the relation with efficiency.

Figure 8:
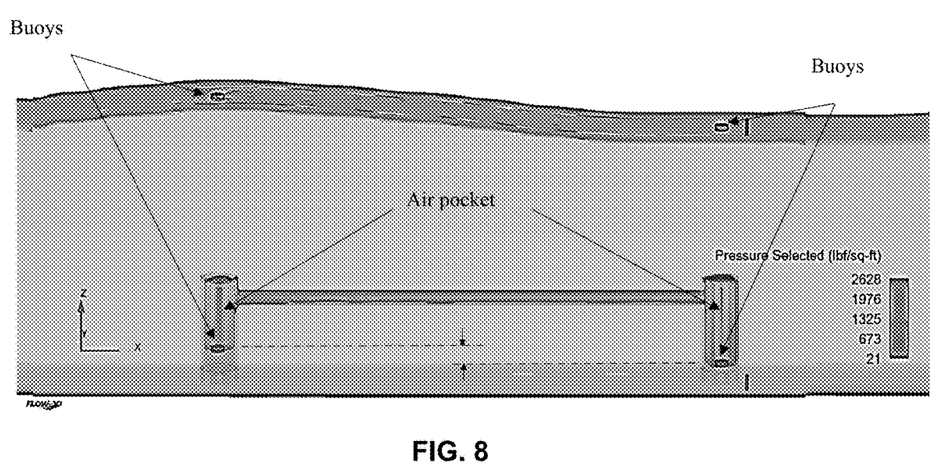
FIG. 8 illustrates a model system utilized in the Examples section, below.
Figure 9:
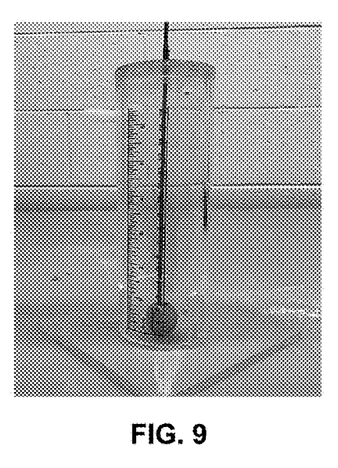
FIG. 9 illustrates a model of a single SOWC utilized in the Examples section, below.

A model, schematically illustrated in FIG. 8, was designed to verify the numerical data. The physical model utilized a 1 ft wide×16 ft long flume with a maximum depth of one foot. A sinusoidal wave generator was used to create regular waves with different lengths and heights. To measure the oscillating water surface inside the SOWC, a long thin rod was placed in a hole drill in the top of a closed three-inch diameter transparent pipe. A wood buoy was placed inside the cylinder to track the water motion inside, as shown (FIG. 9). The two cylinders were placed approximately one-half of an average wavelength apart and connected by a flexible ⅜ inch hose. The initial air pockets were placed in the SOWCs using the flexible hose. The hose allowed air to travel between the SOWCs as the waves moved over the cylinders.

Figure 10:
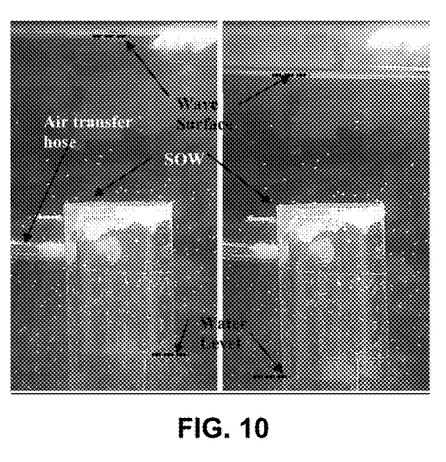
FIG. 10 illustrates the changing water level inside a SOWC of a system utilized in the Examples section, below.

FIG. 10 shows one SOWC with the changing water surfaces (without the wood buoy inside the SOWC).

Example 1

The efficiency of five different configurations for various wave lengths, wave heights and depths were investigated.

Figure 11:
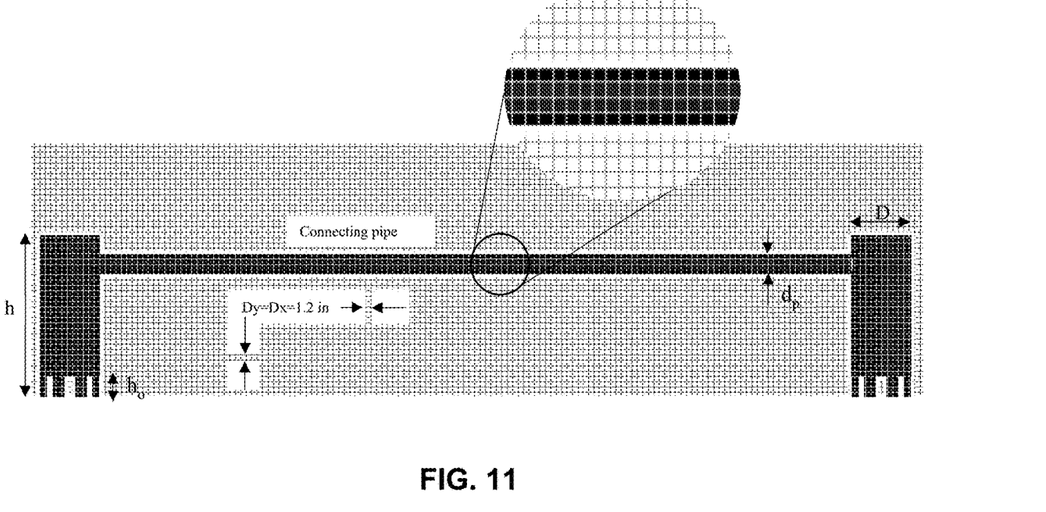
FIG. 11 illustrates a grid domain of a two-SOWC system numerically modeled in the Examples section, below.

Numerical results were obtained by development of a grid domain that consisted of three linked and one embedded mesh blocks (FIG. 11) with over 487,500 total cells. The motion of the floating buoys was modeled as a moving solid. The geometry was constructed from baffles and solids. The total flow domain was greater than four times the wavelength (4λ). Boundary conditions included sidewalls (y direction) with symmetry boundaries; top boundary (z-max) as a pressure boundary with atmospheric pressure equal to 2116 lbf/ft$^2$; bottom boundary as a wall; left upstream inlet side (x-min) as a wave boundary; and the downstream (x-max) as an outflow with a non-moving wave absorbing layer (sponge layer) to prevent wave reflections back into the model. FIG. 11 shows the solid model imported into the constructed numerical grid. The pipe between the two SOWC cylinders allowed air motion as waves pass. The ideal distance between chambers was considered to be one-half of a wavelength, placing the peak of one wave above one cylinder while the trough of the adjacent wave is simultaneously over the second cylinder. Seventeen different numerical simulations were completed by varying the cylinder height, h (2 and 3 feet); water depth, d (4-8 feet); cylinder diameter, D (constant at 1 foot); wave period, T (1.75 s-3.0 s); and wavelength, L. Configurations are shown in Table 1, with the results including the efficiencies at the left buoy, the right buoy, and the average efficiency for the test.

TABLE 1

| Test No. | h | d | T | L (ft) | d/L | d/gT$^2$ | Left Buoy | Right Buoy | Ave. |
|---|---|---|---|---|---|---|---|---|---|
| 1 | 2 | 4 | 1.75 | 14.69 | 0.272 | 0.041 | 55.3% | 58.6% | 57.0% |
| 2 | 2 | 4 | 2.00 | 18.09 | 0.221 | 0.031 | 61.4% | 65.2% | 63.3% |
| 3 | 2 | 4 | 2.25 | 21.41 | 0.187 | 0.025 | 65.9% | 70.7% | 68.3% |
| 4 | 2 | 4 | 2.50 | 24.64 | 0.162 | 0.020 | 74.6% | 75.5% | 75.0% |
| 5 | 2 | 4 | 2.75 | 27.81 | 0.144 | 0.016 | 80.0% | 75.6% | 77.8% |
| 6 | 2 | 4 | 3.00 | 30.93 | 0.129 | 0.014 | 85.1% | 79.0% | 82.1% |
| 7 | 2 | 5 | 2.00 | 19.03 | 0.263 | 0.039 | 47.6% | 51.0% | 49.3% |
| 8 | 2 | 6 | 2.00 | 19.63 | 0.306 | 0.047 | 42.6% | 42.5% | 42.5% |
| 9 | 2 | 7 | 2.00 | 19.99 | 0.350 | 0.054 | 39.6% | 40.2% | 39.9% |
| 10 | 2 | 8 | 2.00 | 20.21 | 0.396 | 0.062 | 32.8% | 31.1% | 32.0% |
| 11 | 3 | 6 | 1.75 | 15.45 | 0.388 | 0.061 | 29.8% | 30.2% | 30.0% |
| 12 | 3 | 6 | 2.00 | 19.63 | 0.306 | 0.047 | 41.0% | 46.0% | 43.5% |
| 13 | 3 | 6 | 2.25 | 23.83 | 0.252 | 0.037 | 50.6% | 53.4% | 52.0% |
| 14 | 3 | 6 | 2.50 | 27.96 | 0.215 | 0.030 | 63.0% | 61.0% | 62.0% |
| 15 | 3 | 6 | 2.75 | 32.02 | 0.187 | 0.025 | 70.0% | 74.0% | 72.0% |
| 16 | 3 | 6 | 3.00 | 35.99 | 0.167 | 0.021 | 78.0% | 82% | 80.0% |
| 17 | 3 | 8 | 2.50 | 29.87 | 0.268 | 0.040 | 52.0% | 48.0% | 50.0% |

Analysis of the numerical results shows that for some configurations, the efficiency can go almost as high as unity. The results also indicated that by increasing the wavelength and wave height, the efficiency increased; however, by increasing the depth, the efficiency decreased.

Figure 12:
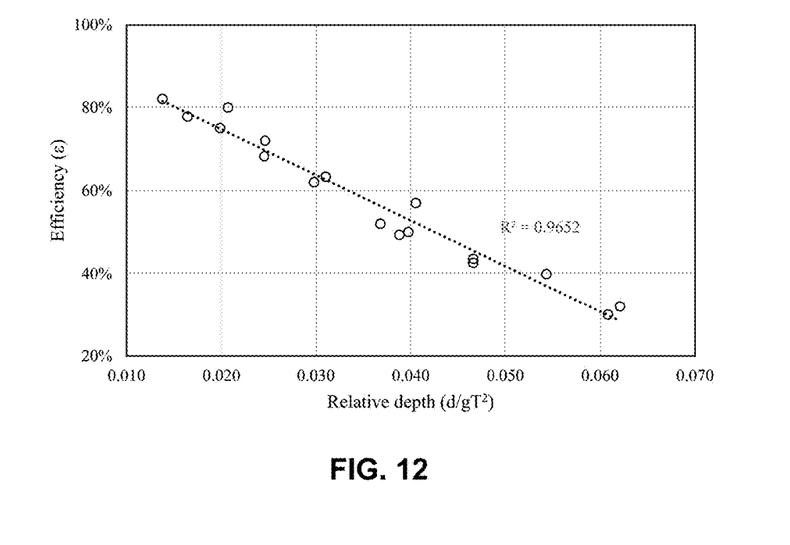
FIG. 12 graphically illustrates the change in efficiency of a two-SOWC system with relative depth.

Test No. 6 in Table 1 has the highest efficiency of 82% and Test No. 11 has the lowest of 30%. The difference is due to the difference in relative depth; by increasing the depth, the efficiency decreased, which is also seen in FIG. 12. As shown in FIG. 12, there is a correlation of R$^2$=0.96 between relative depth and efficiency in the intermediate water depth.

Example 2

The floating buoys' motion was modeled as a moving solid only in the z direction with rotation and translation in other directions restricted. To avoid very small mesh sizes to capture all the thin-walled pipes, the geometry was constructed from baffles. The total flow domain considered was greater than four times the wavelength (4L). Boundary conditions included sidewalls (y direction) with symmetry boundaries; top boundary (z-max) as a pressure boundary with atmospheric pressure equal to 2116 lbf/ft$^2$; bottom boundary as a wall; left upstream inlet side (x-min) as a wave boundary; and the downstream (x-max) as an outflow with a non-moving wave-absorbing layer (sponge layer) to prevent wave reflections back into the model.

Thirty-two different numerical simulations were completed. Stokes-Cnoidal waves were used by varying the wave height, wavelength, and water depth. Five different shapes of SOWC (FIG. 3) were used to investigate the effects of the SOWC's bottom opening on efficiency of the devices. Results are shown in Table 2. In this Table, "d" indicates depth, "L" indicates wavelength, "H" shows the input wave height, and "H calc" shows the obtained wave height. "H buoy" shows the obtained wave height of the oscillations inside the cylinders and the "efficiency %" is the efficiency, which is the ratio of H buoy over H calc.

TABLE 2

| Test No. | FIG. 3 Configuration | d | L | H | H calc | H buoy | efficiency % |
|---|---|---|---|---|---|---|---|
| 1 | A | 6 | 28 | 0.5 | 0.468 | 0.361 | 77% |
| 2 |  | 5.5 | 28 | 0.5 | 0.484 | 0.407 | 84% |
| 3 |  | 5 | 28 | 0.5 | 0.484 | 0.412 | 85% |
| 4 |  | 6 | 20 | 0.5 | 0.401 | 0.237 | 59% |
| 5 |  | 6 | 15.45 | 1 | 0.805 | 0.230 | 29% |
| 6 |  | 6 | 19.63 | 1 | 0.781 | 0.374 | 48% |
| 7 |  | 6 | 23.83 | 1 | 0.891 | 0.452 | 51% |
| 8 |  | 6 | 27.96 | 0.16 | 0.161 | 0.113 | 70% |
| 9 |  | 6 | 32.02 | 1 | 0.915 | 0.664 | 73% |
| 10 |  | 5.5 | 28 | 0.25 | 0.24 | 0.186 | 78% |
| 11 |  | 5 | 28 | 0.25 | 0.267 | 0.210 | 79% |
| 12 | B | 6 | 28 | 0.5 | 0.462 | 0.373 | 81% |
| 13 |  | 5.5 | 28 | 0.5 | 0.484 | 0.374 | 77% |
| 14 |  | 5 | 28 | 0.5 | 0.494 | 0.410 | 83% |
| 15 |  | 6 | 20 | 0.5 | 0.410 | 0.293 | 71% |
| 16 |  | 5 | 28 | 0.25 | 0.263 | 0.199 | 76% |
| 17 | C | 6 | 28 | 0.5 | 0.458 | 0.383 | 84% |
| 18 |  | 5.5 | 28 | 0.5 | 0.484 | 0.418 | 87% |
| 19 |  | 5 | 28 | 0.5 | 0.479 | 0.475 | 99% |
| 20 |  | 6 | 20 | 0.5 | 0.434 | 0.342 | 79% |
| 21 |  | 5 | 28 | 0.25 | 0.250 | 0.206 | 82% |
| 22 | D | 6 | 28 | 0.5 | 0.476 | 0.364 | 77% |
| 23 |  | 5.5 | 28 | 0.5 | 0.481 | 0.393 | 82% |
| 24 |  | 5 | 28 | 0.5 | 0.483 | 0.401 | 83% |
| 25 |  | 6 | 32 | 0.5 | 0.444 | 0.334 | 75% |
| 26 |  | 6 | 20 | 0.5 | 0.419 | 0.283 | 68% |
| 27 |  | 5 | 28 | 0.25 | 0.266 | 0.208 | 78% |
| 28 | E | 6 | 28 | 0.5 | 0.460 | 0.337 | 73% |
| 29 |  | 5.5 | 28 | 0.5 | 0.473 | 0.395 | 83% |
| 30 |  | 5 | 28 | 0.5 | 0.480 | 0.398 | 83% |
| 31 |  | 6 | 20 | 0.5 | 0.392 | 0.317 | 81% |
| 32 |  | 5 | 28 | 0.25 | 0.259 | 0.217 | 84% |

Table 2 indicates efficiency of the 5 different shapes versus depth, wavelength and wave height. As seen in Table 2, the relative movement of the water inside the cylinder to wave height defined the efficiency of the device. Generally, for each shape, by increasing the depth, the efficiency decreased because of the decrease in water particle movements in deeper water, and by decreasing the wave height in a constant depth, the efficiency decreased. The shape of the SOWC illustrated at B in FIG. 3 provides an improvement in efficiency, believed to be due to the increase in the opening area compared that of FIG. 3 at A. In the SOWC illustrated at C of FIG. 3, half of the bottom of the SOWC is open and the other half is closed, which drastically increased the efficiency. In the model, the opening was on the seaside and the half closed area was in the leeside. This configuration captured the translational velocity of the waves and ramped water up into the SOWC, thereby increasing the wave motion. The SOWC illustrated at D in FIG. 3 produces results similar to the SOWC at C. However, this shape could prevent sedimentation and capture of debris better as it is open, and flow can more easily pass through. The last configuration at E is almost completely open from every direction, with only four legs which are used to attach the SOWC to the sea floor.

Figure 13:
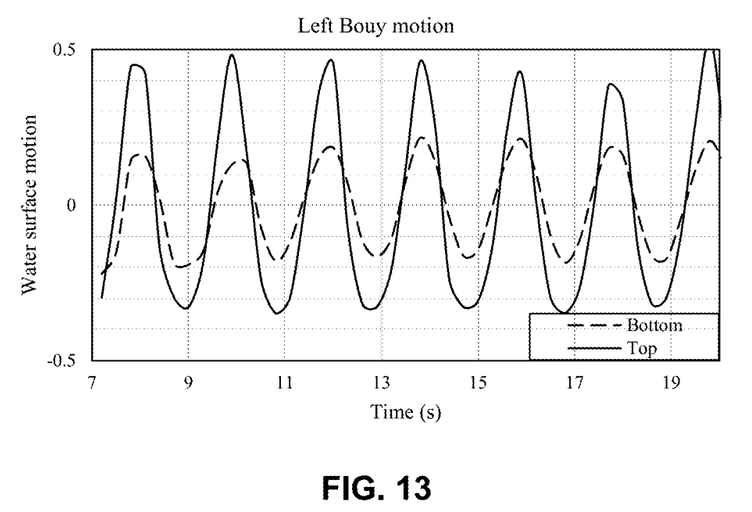
FIG. 13 graphically illustrates the motion of water at the external water surface and at the internal water surface within a SOWC of a system.
Figure 14:
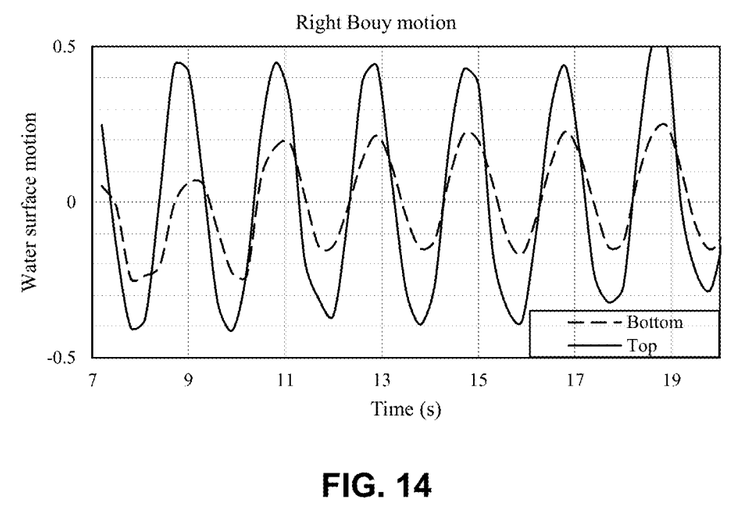
FIG. 14 graphically illustrates the motion of water at the external water surface and at the internal water surface within another SOWC of a system.

FIG. 13 and FIG. 14 compare the oscillating motion of the water within the left and right SOWC of a typical system to that of the external water surface over that SOWC. As shown, the motion within the SOWCs mimicked the external wave motion.

Figure 15:
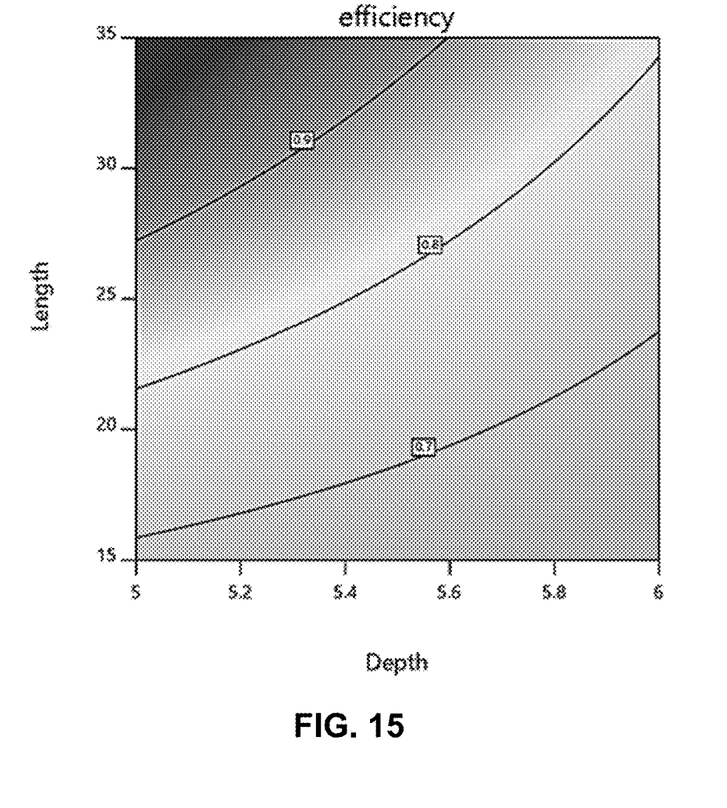
FIG. 15 illustrates the average conversion rate efficiency for a system with change in wavelength and water depth.

As shown in FIG. 15, on average, by increasing the depth of the water, the efficiency decreases, and by increasing the wavelength, the efficiency increases. Comparing Test Nos. 3, 14, 19, 24 and 30 in Table 2, which were all carried out at the same wave conditions with a depth of 5 feet, wavelength of 28 feet, and wave height of 0.5 feet, the efficiency can be improved up to 15% by modification of the water openings in the SOWC.

While certain embodiments of the disclosed subject matter have been described using specific terms, such description is for illustrative purposes only, and it is to be understood that changes and variations may be made without departing from the spirit or scope of the subject matter.

What is claimed is:

1. A wave energy converter system comprising:
   a first submerged oscillating water column (SOWC) comprising a first end attached to a sea floor, a second end at a distance above the sea floor, and a wall extending from the first end to the second end, at least one opening being defined in the first SOWC, the at least one opening allowing water flow between an exterior of the first SOWC and an interior of the first SOWC, the first SOWC comprising a first air pocket at the second end of the first SOWC and within the interior of the first SOWC, the first SOWC retaining a first float within the interior of the first SOWC;
   a second SOWC comprising a first end attached to a sea floor, a second end at a distance above the sea floor, and a wall extending from the first end to the second end, at least one opening being defined in the second SOWC, the at least one opening allowing water flow between an exterior of the second SOWC and an interior of the second SOWC, the second SOWC comprising a second air pocket at the second end of the second SOWC and within the interior of the second SOWC, the second SOWC retaining a second float within the interior of the second SOWC;
   an air line connecting the first air pocket to the second air pocket; and
   a power take-off in mechanical communication with the first float via a first shaft and in mechanical communication with the second float via a second shaft.

2. The system of claim 1, further comprising one or more additional SOWC, each of the one or more additional SOWC comprising an air pocket, each air pocket of the one or more additional SOWC being connected to at least one other air pocket of another SOWC via an air line.

3. The system of claim 1, wherein the first float is in mechanical communication via the first shaft with a first pump of the power take-off and the second float is in mechanical communication via the second shaft with a second pump of the power take-off.

4. The system of claim 3, wherein the first pump and the second pump are connected to a high pressure transmission line.

5. The system of claim 3, wherein the first pump and the second pump are dual action pumps.

6. The system of claim 1, wherein a center of the first SOWC and a center of the second SOWC are separated from one another by a distance that is equivalent to about one-half wavelength of a typical wave passing over the sea floor.

7. The system of claim 1, the first SOWC comprising a first connection associated with the wall of the first SOWC, the first connection providing for the first SOWC to be temporarily disassembled and/or rotated about a hinge.

8. The system of claim 1, the second SOWC comprising a second connection associated with the wall of the second SOWC, the second connection providing for the second SOWC to be temporarily disassembled and/or rotated about a hinge.

9. A method for harvesting wave energy, the method comprising:
   forming a first air pocket at a second end of a first SOWC, the first SOWC comprising a first end attached to a sea floor, the second end being at a distance above the sea floor, with a wall extending from the first end to the second end, at least one opening being defined in the wall, the at least one opening allowing water flow between an exterior of the first SOWC and an interior of the first SOWC;
   forming a second air pocket at a second end of a second SOWC, the second SOWC comprising a first end attached to a sea floor, the second end being at a distance above the sea floor, with a wall extending from the first end to the second end, at least one opening being defined in the wall, the at least one opening allowing water flow between an exterior of the second SOWC and an interior of the second SOWC; and
   connecting the first air pocket to the second air pocket via an air line; wherein as a wave passes the first SOWC and the second SOWC, a first water level within the first SOWC and a second water level within the second SOWC mimic the vertical motion of the water of the passing wave, causing air to move between the first air pocket and the second air pocket and causing a first float retained within the first SOWC and a second float retained within the second SOWC to oscillate; wherein the first float and the second float are connected to a power take-off, the power take-off comprising a first pump in mechanical communication with the first float and a second pump in mechanical communication with the second float, the oscillating motion of the first and second floats being translated to energy of a pump fluid that is pumped by the first and second pumps.

10. The method of claim 9, the method further comprising forming an air pocket at a second end of each of one or more additional SOWC and connecting the air pocket of each of the one or more additional SOWC to at least one other air pocket of another SOWC.

11. The method of claim 9, further comprising storing the energy of the pump fluid.

12. The method of claim 11, wherein the energy is stored in a reservoir.

13. The method of claim 9, further comprising utilizing the energy of the pump fluid to generate electricity.

14. The method of claim 9, wherein the first SOWC and the second SOWC are submerged in transitional depth water or shallow water.

15. The method of claim 9, the first SOWC and the second SOWC each independently exhibiting a change in water depth within the first SOWC and the second SOWC as the wave passes the first SOWC and the second SOWC, respectively, of about 70% or greater of the vertical motion of the water of the passing wave.

16. The method of claim 9, wherein the first water level is below the water level of the passing wave at the first SOWC and the second water level is below the water level of the passing wave at the second SOWC.

17. The method of claim 9, wherein the first SOWC and the second SOWC are located in an ocean area at which the ratio of a typical wave height to a typical depth is about 0.78 or less.

\* \* \* \* \*